(12) United States Patent
Sakurai et al.

(10) Patent No.: US 7,376,498 B2
(45) Date of Patent: May 20, 2008

(54) VEHICLE CONTROLLER

(75) Inventors: Kohei Sakurai, Tokyo (JP); Nobuyasu Kanekawa, Tokyo (JP); Yuichiro Morita, Tokyo (JP); Kotaro Shimamura, Tokyo (JP); Shoji Sasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 221 days.

(21) Appl. No.: 11/053,842

(22) Filed: Feb. 10, 2005

(65) Prior Publication Data

US 2005/0234614 A1  Oct. 20, 2005

(30) Foreign Application Priority Data

Apr. 20, 2004  (JP) .............................. 2004-123611

(51) Int. Cl.
  *G06F 19/00* (2006.01)
(52) U.S. Cl. .............................. 701/29; 701/36; 701/43
(58) Field of Classification Search ................. 701/29, 701/33–36, 41–43; 180/6.2, 6.24, 280, 443, 180/446; 280/5.51; 342/61, 70, 71
  See application file for complete search history.

(56) References Cited

U.S. PATENT DOCUMENTS 6,028,537 A * 2/2000 Suman et al. ............... 340/988
6,493,618 B2 * 12/2002 Nada ............................ 701/34
6,782,968 B2 * 8/2004 Sakugawa .................... 180/446

FOREIGN PATENT DOCUMENTS

| EP | 0 721 876 A2 | 7/1996 |
| EP | 0 810 142 A2 | 12/1997 |
| EP | 0 863 065 A2 | 9/1998 |
| EP | 1 149 754 A2 | 10/2001 |
| EP | 1 378 420 A2 | 1/2004 |
| JP | 2002-354871 | 12/2002 |

OTHER PUBLICATIONS

European Search Report Dated Oct. 11, 2005 (Four (4) Pages).

* cited by examiner

*Primary Examiner*—Yonel Beaulieu
(74) *Attorney, Agent, or Firm*—Crowell & Moring LLP

(57) ABSTRACT

A vehicle controller which can realize a reduced cost and high reliability at the same time. A control target status signal outputted from a control target is inputted to a monitoring unit. The monitoring unit compares a control command value with the control target status signal to determine whether the control target operates normally as per the control command value. When the monitoring unit determines that the control target does not operate normally, it outputs a failure detected signal to an actuator driving unit.

11 Claims, 12 Drawing Sheets

VEHICLE CONTROLLER

BACKGROUND OF THE INVENTION

1. Field of the Invention

The present invention relates to a vehicle controller, and more particularly to a vehicle controller for controlling an actuator, such as a motor, in a vehicle control system that enables driving, steering and braking of a vehicle to be performed under electronic control.

2. Description of the Related Art

Recently, aiming at improving comfortableness and safety in running of an automobile, a vehicle control system (called an X-by-Wire system) has been more actively developed which serves to reflect driver's operations, such as accelerating, steering and braking operations, on vehicle mechanisms for generating driving, steering and braking forces, respectively, through electronic control without employing mechanical linkages. Such a system is required to have high reliability so that the vehicle driving, steering and braking functions are in no way failed.

To increase reliability of the overall system, a controller constituting the system is also required to realize high reliability. Various types of failsafe designs have hitherto been proposed for a controller that controls a motor. Many of the failsafe designs employ a redundant arrangement in which the operation of a first microcomputer (main microcomputer) is monitored by a second microcomputer (monitoring microcomputer).

There is known, for instance, an exercise computation technique in which the monitoring microcomputer sets an exercise (example problem) to the main microcomputer. The main microcomputer computes an answer of the exercise and sends it to the monitoring microcomputer. Then, the monitoring microcomputer compares the answer sent from the main microcomputer with an answer stored therein beforehand. It is thereby checked whether the operation of the main microcomputer is normal.

Also, JP-A-2002-354871 discloses one instance of a motor-powered steering system in which the second microcomputer computes the magnitude of a motor's d-axis current, and whether the first microcomputer operates normally is determined depending on whether the computed magnitude is larger than a predetermined value.

SUMMARY OF THE INVENTION

A key factor for practicing the X-by-Wire system is to realize high reliability without noticeably increasing the cost of a vehicle controller, etc.

Looking from that point of view, the known exercise computation technique is satisfactory because a computation load of the monitoring microcomputer can be reduced as compared with that of the main microcomputer and the microcomputer cost is not so increased even with the redundant arrangement. However, there is a problem that when a vehicle controller utilizing the exercise computation technique is employed in the above-mentioned vehicle control system which is required to have high reliability, it is not sure whether an exercise capable of guaranteeing a sufficient level of failure detection accuracy can be prepared. Another problem is that since the exercise computation problem is basically intended to check a computing section of the microcomputer, it is also not sure to be able to obtain a guarantee as to whether a final motor output is normal.

On the other hand, the technique disclosed in JP-A-2002-354871 can be thought of as having sufficiently high reliability, but it has the following problem. As with the first microcomputer, the second microcomputer is also required to execute the computation of an electrical angle and the computation for conversion from uvw-coordinates into dq-coordinates, and therefore it must have a higher computation capability than the monitoring microcomputer. Thus, the microcomputer cost is increased with the redundant arrangement.

In view of the above-described problems in the art, it is an object of the present invention to provide a vehicle controller capable of ensuring high reliability even with the use of a microcomputer that is not so powerful in computation capability and is inexpensive.

To achieve the above object, a vehicle controller according to the present invention comprises a control circuit receiving a first signal from the exterior and outputting a driving signal; an actuator driving circuit receiving the driving signal from the control circuit and outputting a second signal to the exterior; and a monitoring circuit for comparing the first signal with a third signal from the exterior and outputting a failure detected signal to the actuator driving circuit when a difference between the first signal and the third signal exceeds a predetermined value.

Preferably, the monitoring circuit comprises a comparing unit for comparing the first signal with the third signal, and a comparison trigger signal generator for generating a trigger signal to start the comparison in the comparing unit.

Preferably, the monitoring circuit receives the first signal from the exterior via the control circuit.

Preferably, the monitoring circuit sends a normal operation confirmation signal to the control circuit. More preferably, the normal operation confirmation signal is periodically sent, and if the control circuit cannot receive the normal operation confirmation signal for a predetermined period, the control circuit outputs a second failure detected signal, and supply of power to an external actuator is cut off with outputting of one of the failure detected signal from the monitoring circuit and the second failure detected signal from the control circuit.

Preferably, the logical product of the driving signal and the failure detected signal is computed such that supply of power to an external actuator is cut off when any of the control circuit and the monitoring circuit is failed.

In a practical form, the first signal represents a control command value inputted from the exterior, and the third signal is a control target status signal outputted from an external control target.

In one more specific practical form, the vehicle controller is a device for controlling a steering motor which generates a steering force depending on a steering operation input, and the control command value is a steering angle command value of a vehicle which is produced in accordance with a signal value from a sensor for measuring a steering operation input.

In another more specific practical form, the vehicle controller is a device for controlling a motor which generates a braking force, and the control command value is a command value indicating a force applied to press a brake pad against a disk rotor in accordance with a signal value from a brake pedal position sensor for measuring a brake pedal operation input.

Thus, the present invention can provide a vehicle controller having a reduced cost and high reliability.

DESCRIPTION OF THE PREFERRED EMBODIMENTS

Embodiments of a vehicle controller of the present invention will be described below with reference to the drawings.

Figure 1:
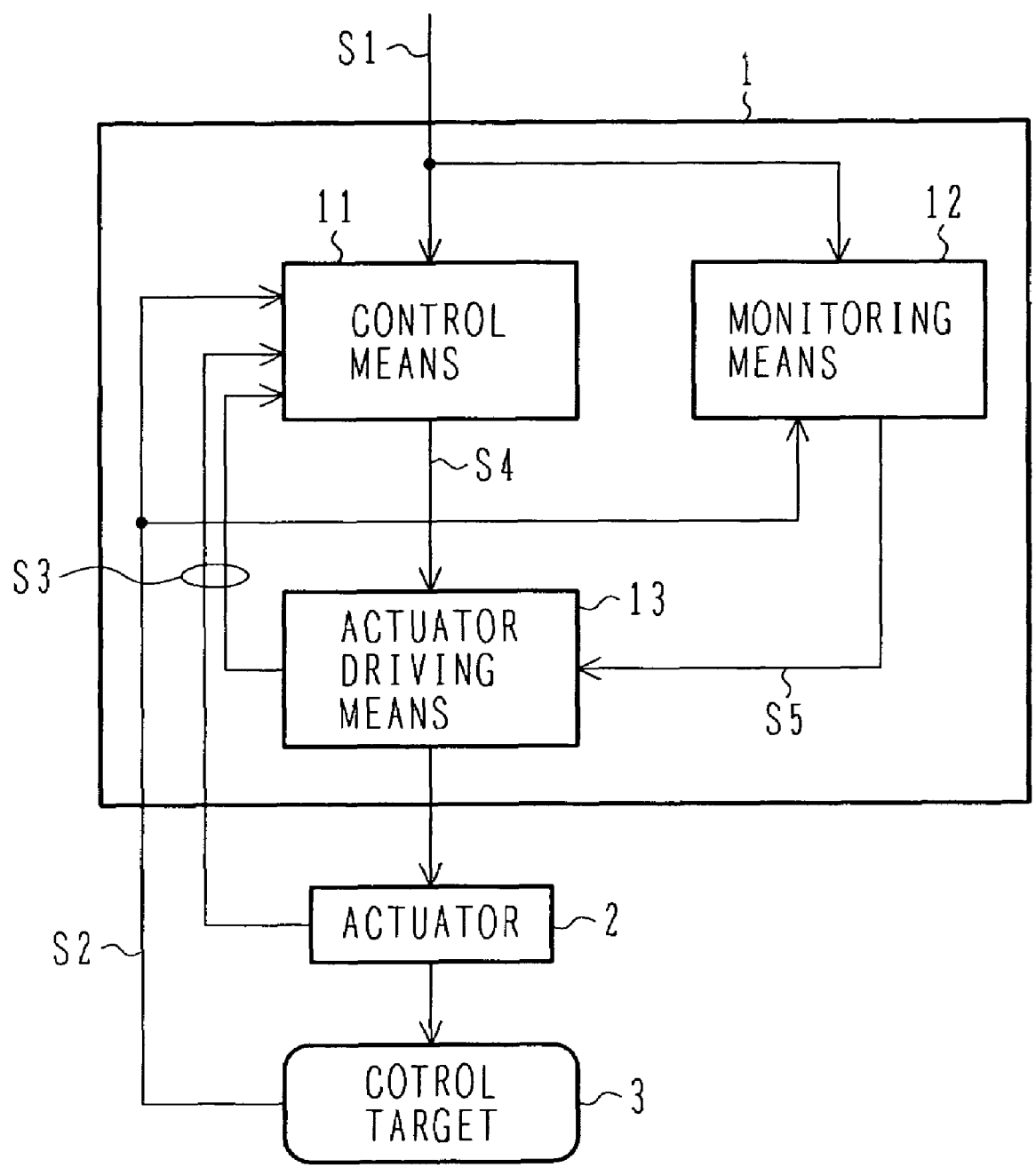
FIG. 1 is a block diagram showing a basic configuration of a vehicle controller of the present invention.

FIG. 1 shows a basic configuration of a vehicle controller of the present invention. A vehicle controller 1 of the present invention comprises a control means (circuit) 11, a monitoring means (circuit) 12, and an actuator driving means (circuit) 13. The actuator driving means 13 drives an actuator 2 to operate a control target 3. A control command value S1, a control target status signal S2, and actuator status signals S3 are inputted to the control means 11. Based on those input signals, the control means 11 outputs a driving signal S4 to drive the actuator driving means 13. The control command value S1 and the control target status signal S2 are also inputted to the monitoring means 12. The monitoring means 12 compares those two input signals and outputs a failure detected signal S5 to the actuator driving means 13 in accordance with the comparison result.

Figure 2:
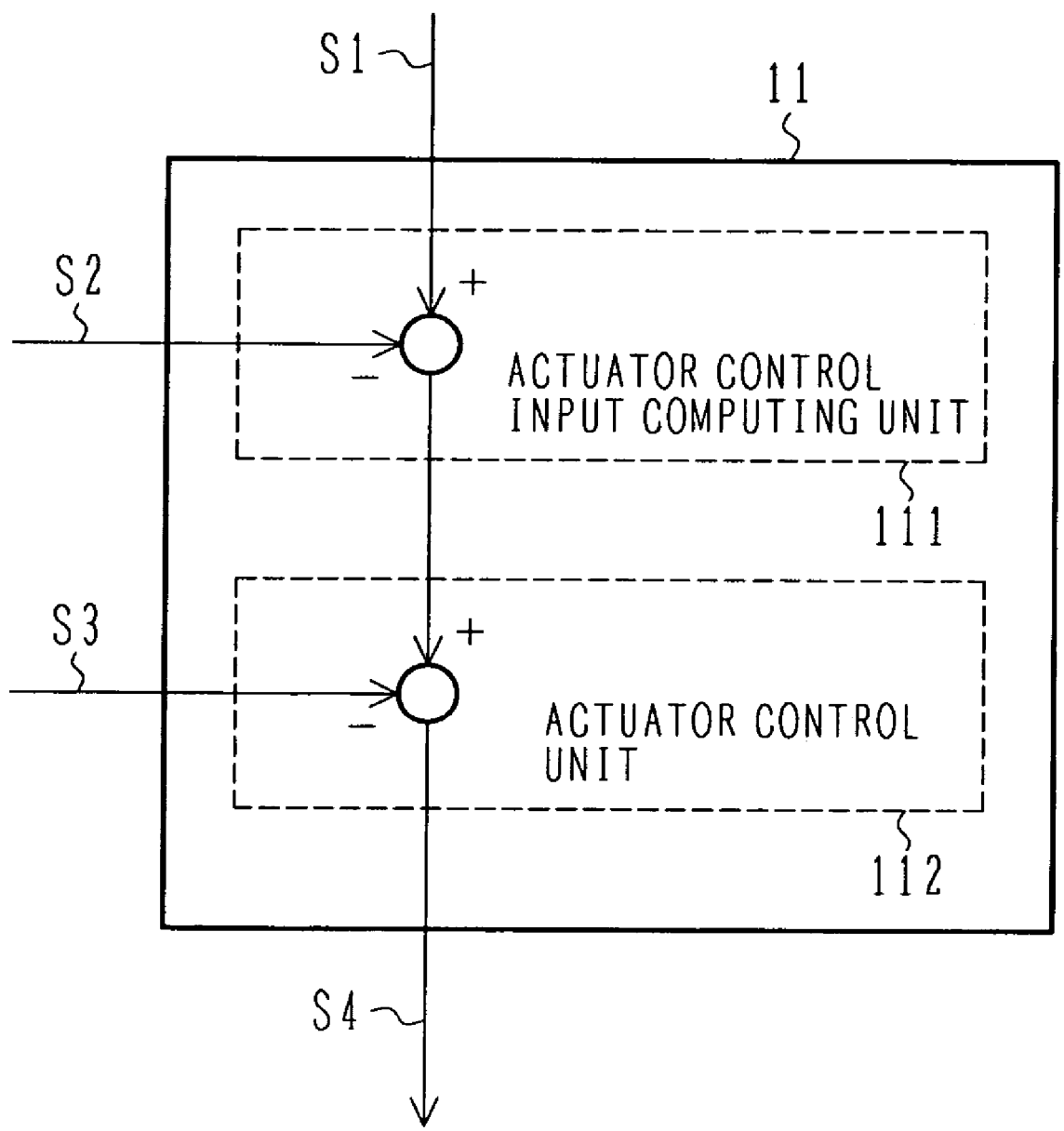
FIG. 2 is a block diagram showing the function of a control means.
Figure 3:
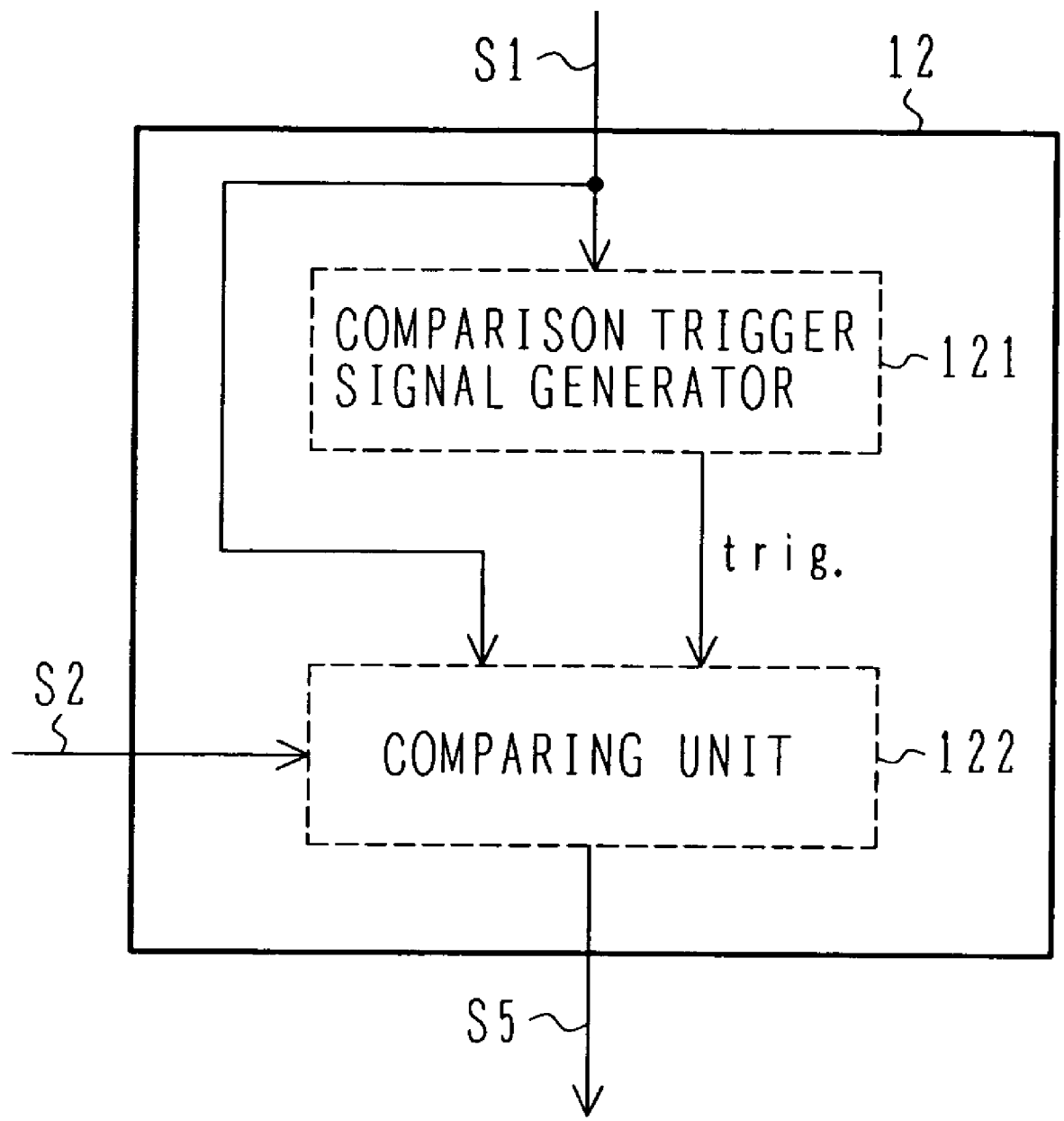
FIG. 3 is a block diagram showing the function of a monitoring means.

FIGS. 2 and 3 are block diagrams showing, respectively, the functions of the control means 11 and the monitoring means 12. The control means 11 comprises an actuator control input computing unit 111 for computing an actuator control input so that the control command value S1 and the control target status signal S2 are kept in match with each other, and an actuator control unit 112 for controlling the actuator so that the actuator control input and the actuator status signal S3 are kept in match with each other. Also, the monitoring means 12 comprises a comparing unit 122 for checking whether the control command value S1 and the control target status signal S2 are in match with each other, and then outputting the failure detected signal S5 to the actuator driving means 13 when S1 and S2 are in mismatch beyond a certain allowable error range, and a comparison trigger signal generator 121 for generating a trigger signal to start the match checking computation in the comparing unit 122.

Figure 4:
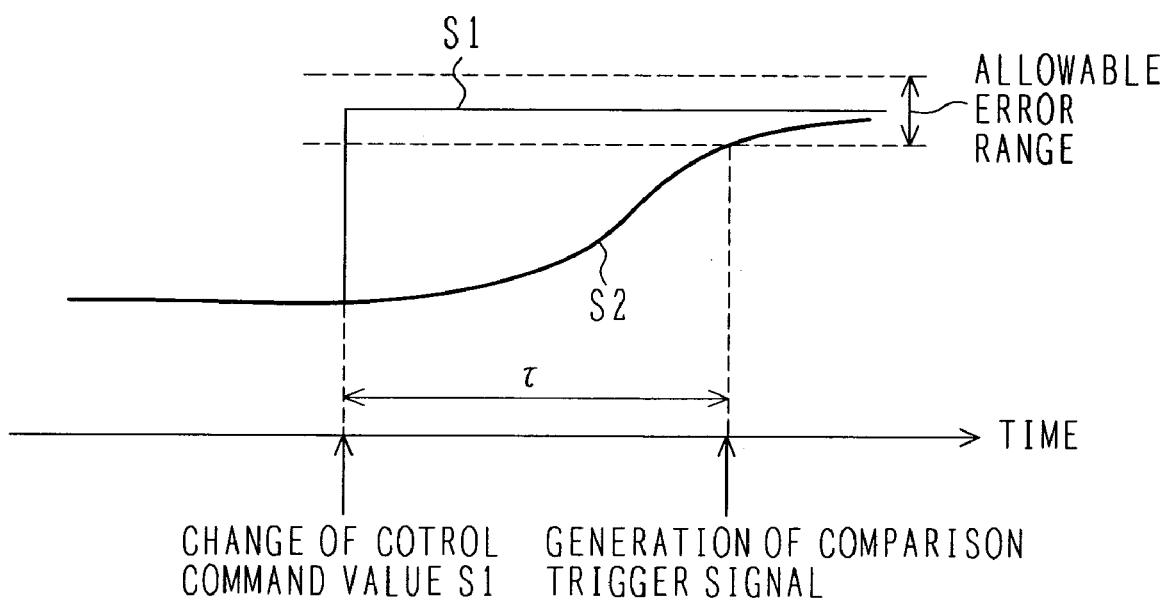
FIG. 4 is a chart for explaining the timing at which a comparison trigger signal is generated.

As shown in FIG. 4, the comparison trigger signal generator 121 outputs the comparison trigger signal to the comparing unit 122 after the lapse of a certain previously-stored time τ or the lapse of a time τ derived through an output response model computation, for example, from a change of the control command value S1.

Such a design enables the match between S1 and S2 to be checked in consideration of a delay time from the change of the control command value S1 to the actual operation of the control target 3.

The present invention is featured in that the control target status signal S2 is inputted to the monitoring means 12 which compares the inputted signal S2 with the control command value S1, thereby determining whether the control target is operated as per the control command value, namely determining rationality of the operation of the control target. With the present invention, if any of the control means 11, the actuator driving means 13, the actuator 2, and the control target 3 is failed, the failure can be detected without causing the monitoring means 12 to execute complicated computation.

As described above, since whether the control target is operated as per the control command value is determined by inputting the control target status signal to the monitoring means and comparing the inputted signal with the control command value, the monitoring means is not required to execute complicated computation. Consequently, a vehicle controller with high reliability can be realized at a relatively low cost.

First Embodiment

Figure 5:
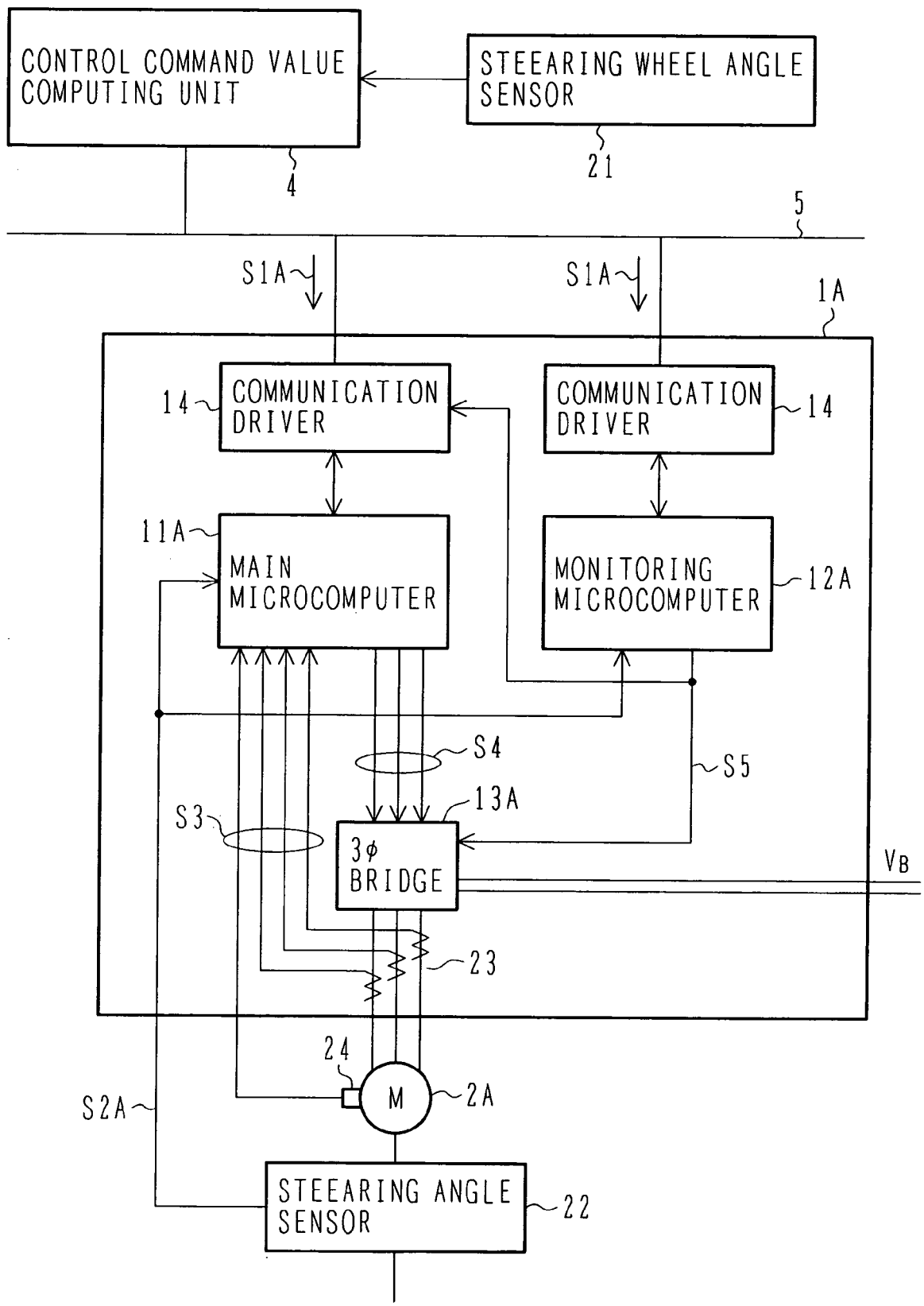
FIG. 5 is a block diagram of a vehicle controller according to a first embodiment of the present invention.

FIG. 5 shows a vehicle controller according to a first embodiment of the present invention. This first embodiment is related to a vehicle controller for controlling a motor, which is used to produce a steering force, in a vehicle control system (Steer-by-Wire system) that enables a driver's steering operation to be reflected on a steering force generating mechanism of a vehicle through electronic control without employing mechanical linkages.

The vehicle control system of this embodiment comprises a control command value computing unit 4 for computing a steering angle command value S1A of the vehicle based on a signal value from a steering wheel angle sensor 21 that measures a steering operation input applied from the driver, a motor controller 1A for controlling a 3-phase motor 2A, and a communication network 5 for connecting the control command value computing unit 4 and the motor controller 1A to each other. The steering angle command value S1A is inputted to the motor controller 1A via the communication network 5.

The motor controller 1A comprises a main microcomputer 11A serving as the control means, a monitoring microcomputer 12A serving as the monitoring means, a 3-phase bridge circuit 13A serving as the actuator driving means, and a communication driver 14 for receiving data from the communication network 5 or sending data to the communication network 5. In this embodiment, two units of communication drivers 14 are provided so that the main microcomputer 11A and the monitoring microcomputer 12A are able to access the communication network 5 independently of each other. It is assumed here that a communication controller for interpreting communication protocols, etc. and performing communication control is incorporated in each of the microcomputers. In addition to the steering angle command value S1A, the main microcomputer 11A further receives, as the actuator status signals S3, a signal from a sensor 24 for detecting the rotor position of the 3-phase motor 2A and signals from a circuit 23 for detecting motor currents, and as the steering angle sensor signal S2A, a signal from a steering angle sensor 22. Also, in addition to the steering angle command value S1A, the monitoring microcomputer 12A further receives, as the steering angle sensor signal S2A, the signal from the steering angle sensor 22.

The monitoring microcomputer 12A checks a match between the steering angle command value S1A and the signal S2A from the steering angle sensor 22. When S1A and S2A are in mismatch beyond a certain allowable error range, the monitoring microcomputer 12A outputs the failure detected signal S5 to the 3-phase bridge circuit 13A, thereby stopping the supply of a source power VB to the 3-phase motor 2A. The failure detected signal S5 is also sent to the communication driver 14 for the main microcomputer 11A, thereby inhibiting access to the communication network 5 from the main microcomputer 11A. In other words, the motor controller 1A can be constructed in a failsafe manner by designing the monitoring microcomputer 12A so as to output the failure detected signal S5 with the detection of a failure. Because the 3-phase motor 2A is not operated in the event of failure, the system must be constructed such that, though not shown, the steering operation can be continued by using, e.g., a mechanical backup mechanism separately provided. However, such fail operability is outside the scope of the present invention and therefore is not described in detail in this specification.

Figure 6:
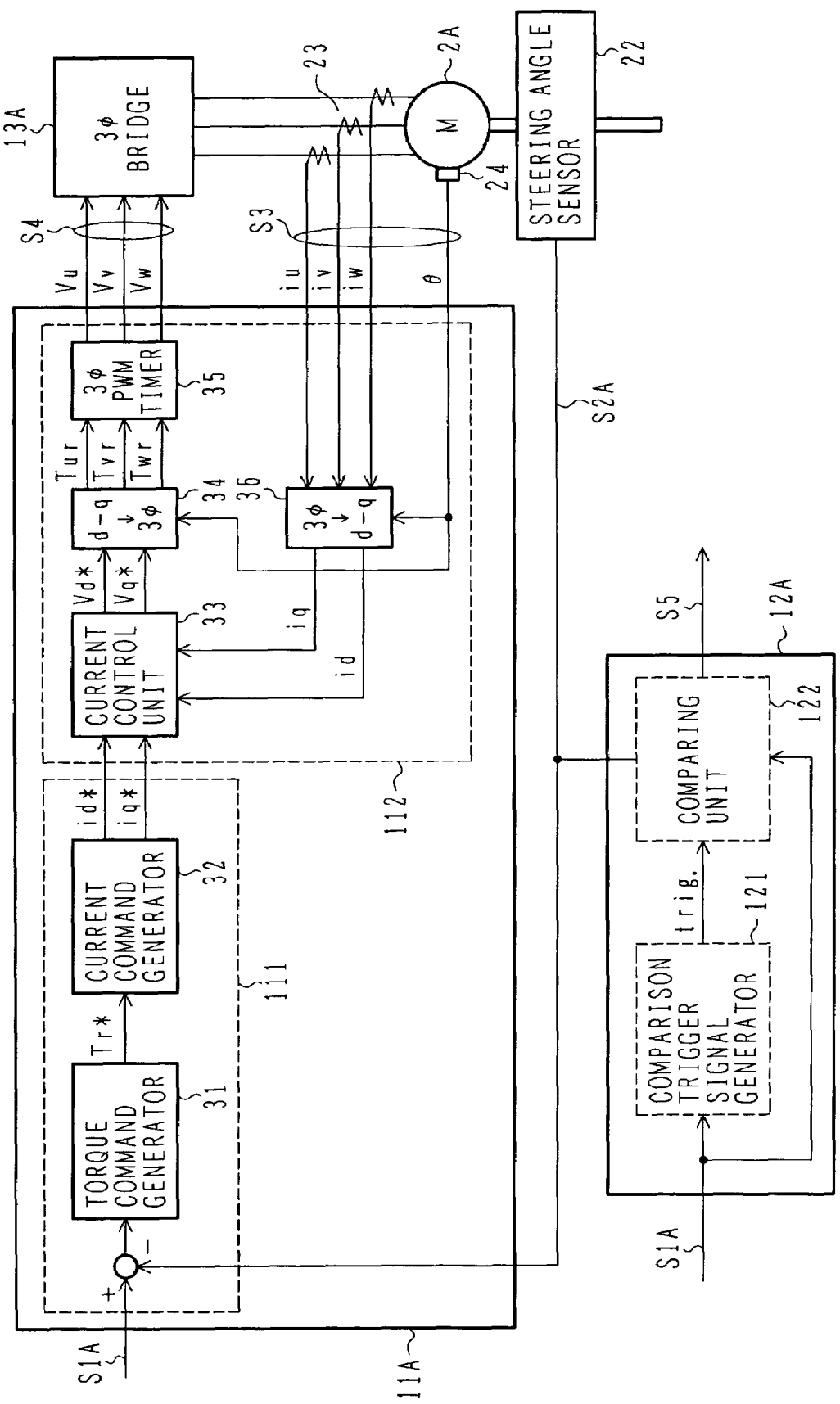
FIG. 6 is a control block diagram of a main microcomputer and a monitoring microcomputer.

FIG. 6 is a control block diagram of the main microcomputer 11A and the monitoring microcomputer 12A. In the main microcomputer 11A, the actuator control input computing unit 111 comprises a torque command generator 31 and a current command generator 32. The actuator control unit 112 comprises a current control unit 33, a coordinate conversion computing unit 34 for the conversion from dq-coordinates into uvw-coordinates, a 3-phase PWM timer 35, and a coordinate conversion computing unit 36 for the conversion from uvw-coordinates into dq-coordinates. Control flow for a 3-phase motor is well known and therefore is not described in detail in this specification.

As with the monitoring means 12 described above, the monitoring microcomputer 12A comprises the comparison trigger signal generator 121 and the comparing unit 122. The comparison trigger signal generator 121 generates the trigger signal to start the match checking computation in the comparing unit 122. The comparing unit 122 receives the trigger signal and checks whether the steering angle command value S1A and the signal S2A from the steering angle sensor 22 are in match with each other. Then, the comparing unit 122 outputs the failure detected signal S5 to the actuator driving means 13 when S1A and S2A are in mismatch beyond a certain allowable error range.

According to this embodiment, as described above, since the monitoring microcomputer is not required to execute complicated computation such as the coordinate conversion computation, it can be constructed of a relatively inexpensive 8-bit or 16-bit microcomputer. Further, if any of the main microcomputer, the 3-phase bridge circuit, the 3-phase motor, and the control target is failed, the failure can be detected. Consequently, a vehicle controller with high reliability can be provided at a relatively low cost.

Second Embodiment

Figure 7:
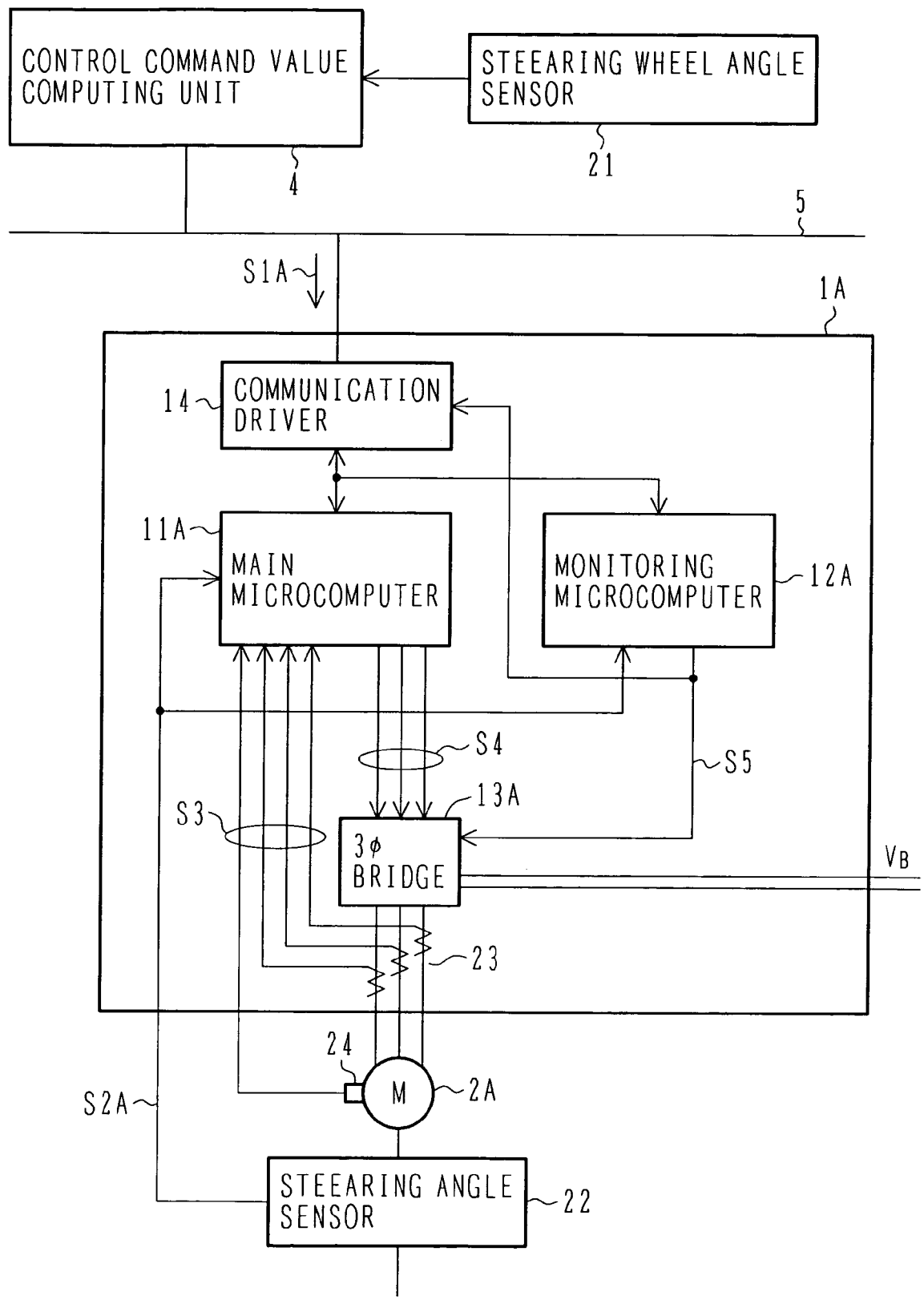
FIG. 7 is a block diagram of a vehicle controller according to a second embodiment of the present invention.

FIG. 7 shows a vehicle controller according to a second embodiment of the present invention. This second embodiment has the same basic configuration as that of the first embodiment, but the former differs from the latter in that only one unit of communication driver 14 is provided. The steering angle command value S1A is received by the communication driver 14, following which the value S1A is inputted to both the main microcomputer 11A and the monitoring microcomputer 12A.

In this second embodiment, the monitoring microcomputer 12A receives the steering angle command value S1A from the control command value computing unit 4 via the main microcomputer 11A. Accordingly, if any abnormality occurs in the main microcomputer 11A after the main microcomputer 11A has taken out data of the steering angle command value S1A from a received frame, and the taken-out data includes an error, there is a possibility that the steering angle command value S1A not intended by the control command value computing unit 4 is also sent to the monitoring microcomputer 12A and a failure of the main microcomputer 11A cannot be detected. Such a possibility can be avoided, by way of example, as follows. The control command value computing unit 4 produces data containing a check code (e.g., a checksum value) regarding the data itself. The main microcomputer 11A takes out that data and sends the taken-out data, including the check code, to the monitoring microcomputer 12A without processing the data. Then, the monitoring microcomputer 12A confirms based on the check code whether the received steering angle command value S1A contains an error.

Third Embodiment

Figure 8:
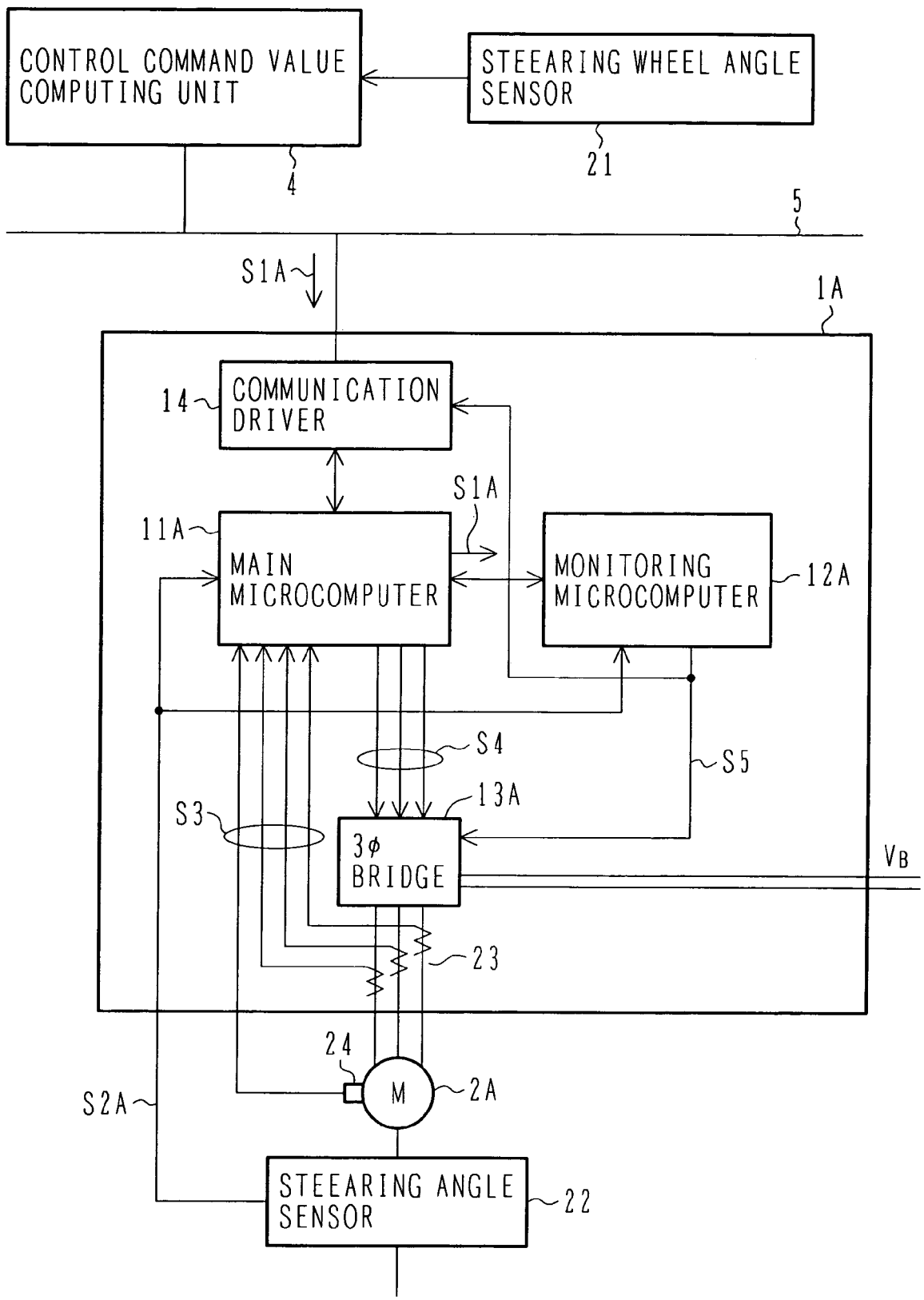
FIG. 8 is a block diagram of a vehicle controller according to a third embodiment of the present invention.

FIG. 8 shows a vehicle controller according to a third embodiment of the present invention. In this third embodiment, data can be sent and received between the main microcomputer 11A and the monitoring microcomputer 12A via serial communication. The monitoring microcomputer 12A receives the steering angle command value S1A, which has been inputted to the main microcomputer 11A via the communication network 5, from the main microcomputer 11A via serial communication. In this third embodiment, unlike the first and second embodiments, the monitoring microcomputer is not required to have an interface circuit for accessing the communication network, and therefore the cost of the vehicle controller can be further cut.

Figure 9:
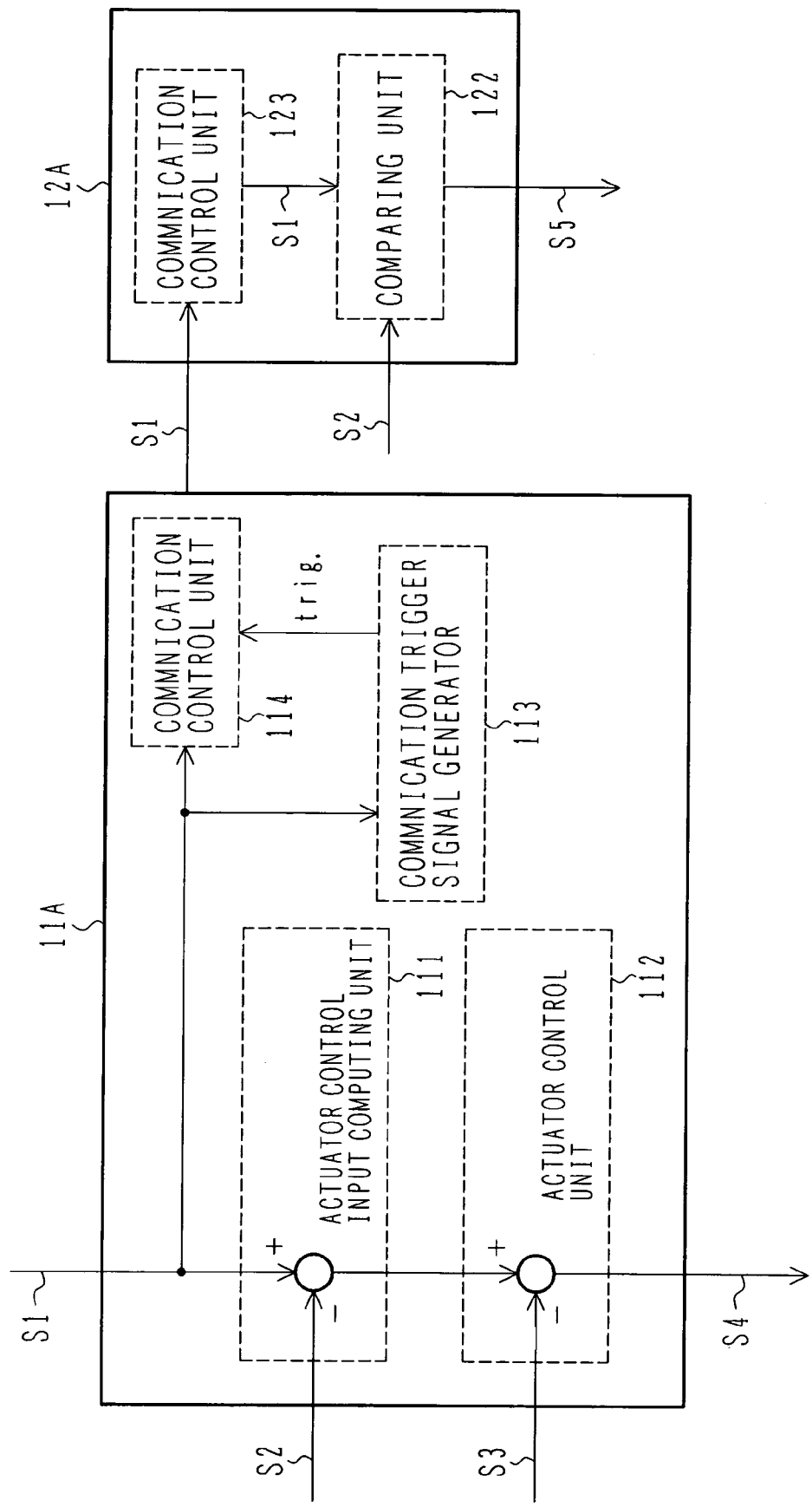
FIG. 9 is a block diagram showing the functions of the control means and the monitoring means.

To check the match between S1 and S2 in consideration of a delay time from the change of the control command value S1 to the actual operation of the control target, as shown in FIG. 9, this third embodiment includes a communication trigger signal generator 113 for sending the steering angle command value S1 to the monitoring microcomputer 11A via serial communication after the lapse of a certain previously-stored time τ or the lapse of a time τ derived through an output response model computation, for example, from a change of the control command value S1.

As a result, the monitoring microcomputer 12A is no longer required to have the function of generating the comparison trigger signal, and the computation load of the monitoring microcomputer can be further reduced.

Fourth Embodiment

Figure 10:
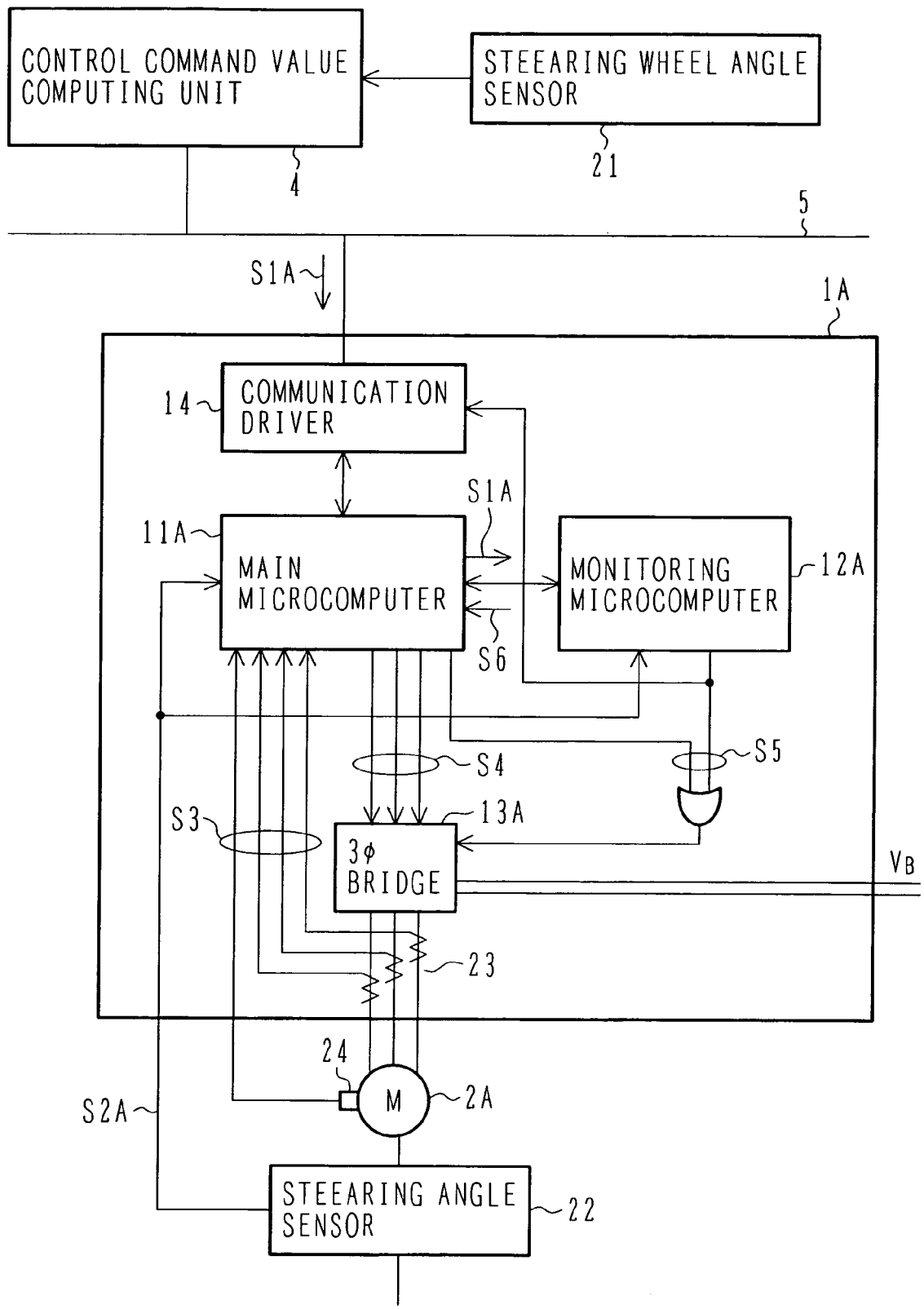
FIG. 10 is a block diagram of a vehicle controller according to a fourth embodiment of the present invention.

FIG. 10 shows a vehicle controller according to a fourth embodiment of the present invention. This fourth embodiment includes the function of monitoring the monitoring microcomputer 12A in addition to the configuration of the third embodiment. The monitoring microcomputer 12A periodically sends a monitoring-microcomputer normal operation confirmation signal S6 to the main microcomputer 11A via serial communication. If a state incapable of receiving the monitoring-microcomputer normal operation confirmation signal S6 continues for a predetermined period, the main microcomputer 11A determines that the monitoring microcomputer 12A has failed, and outputs another failure detected signal S5 to the 3-phase bridge circuit 13A, thereby stopping the supply of the source power VB to the 3-phase motor 2A.

The logical product of the failure detected signal S5 from the monitoring microcomputer 12A and the failure detected signal S5 from the main microcomputer 11A is computed and inputted to the 3-phase bridge circuit 13A so that the supply of the power to the 3-phase motor 2A can be cut off when any of the two microcomputers is failed.

Fifth Embodiment

Figure 11:
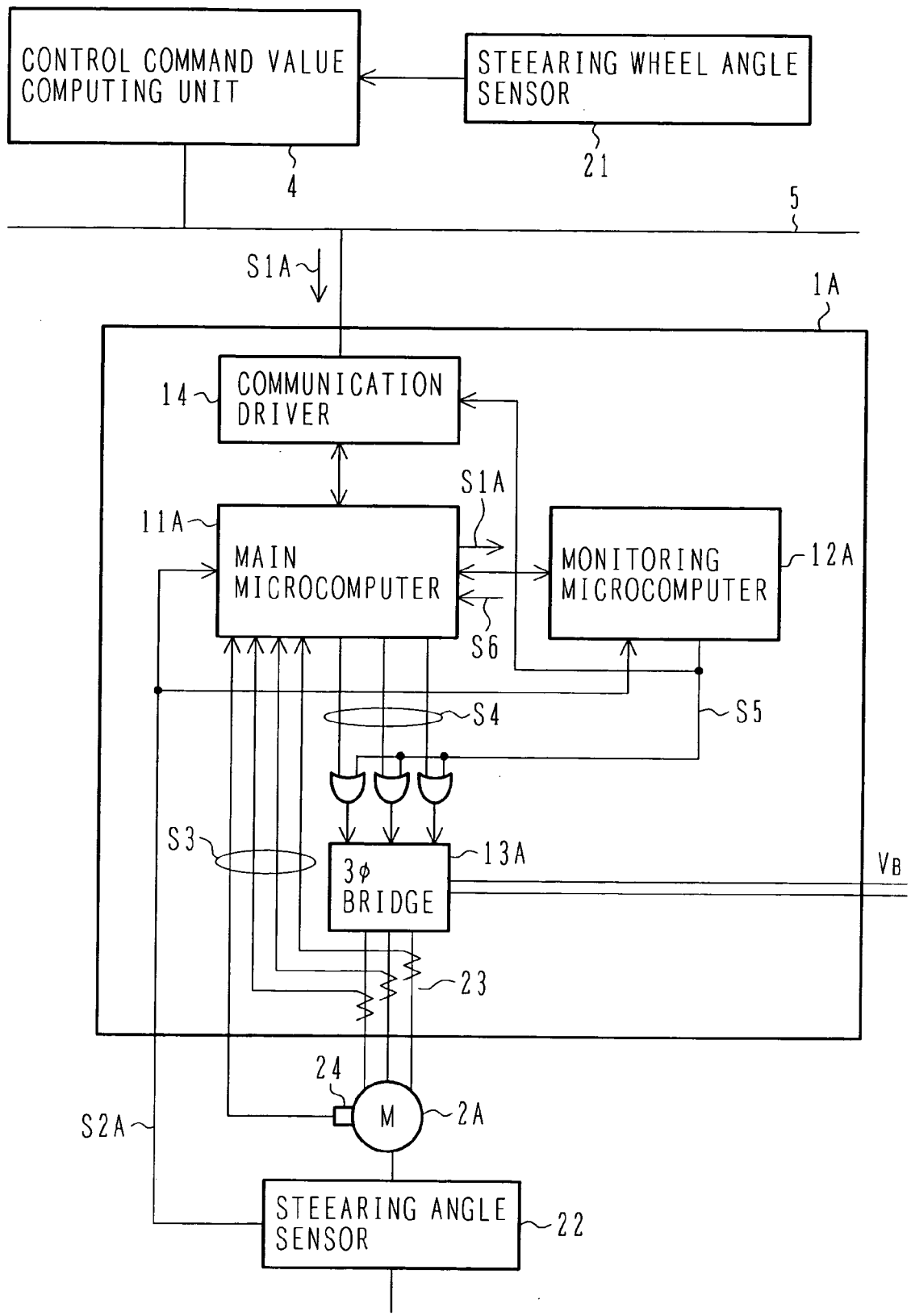
FIG. 11 is a block diagram of a vehicle controller according to a fifth embodiment of the present invention.

FIG. 11 shows a vehicle controller according to a fifth embodiment of the present invention. In this fifth embodiment, the 3-phase bridge circuit 13A is controlled in accordance with the logical product of the failure detected signal S5 outputted from the monitoring microcomputer 12A and each driving signal S4 outputted from the main microcomputer 11A for on/off control of a gate of the 3-phase bridge circuit 13A.

With such an arrangement, the supply of the power to the 3-phase motor 2A can be cut off when any of the two microcomputers is failed.

Sixth Embodiment

Figure 12:
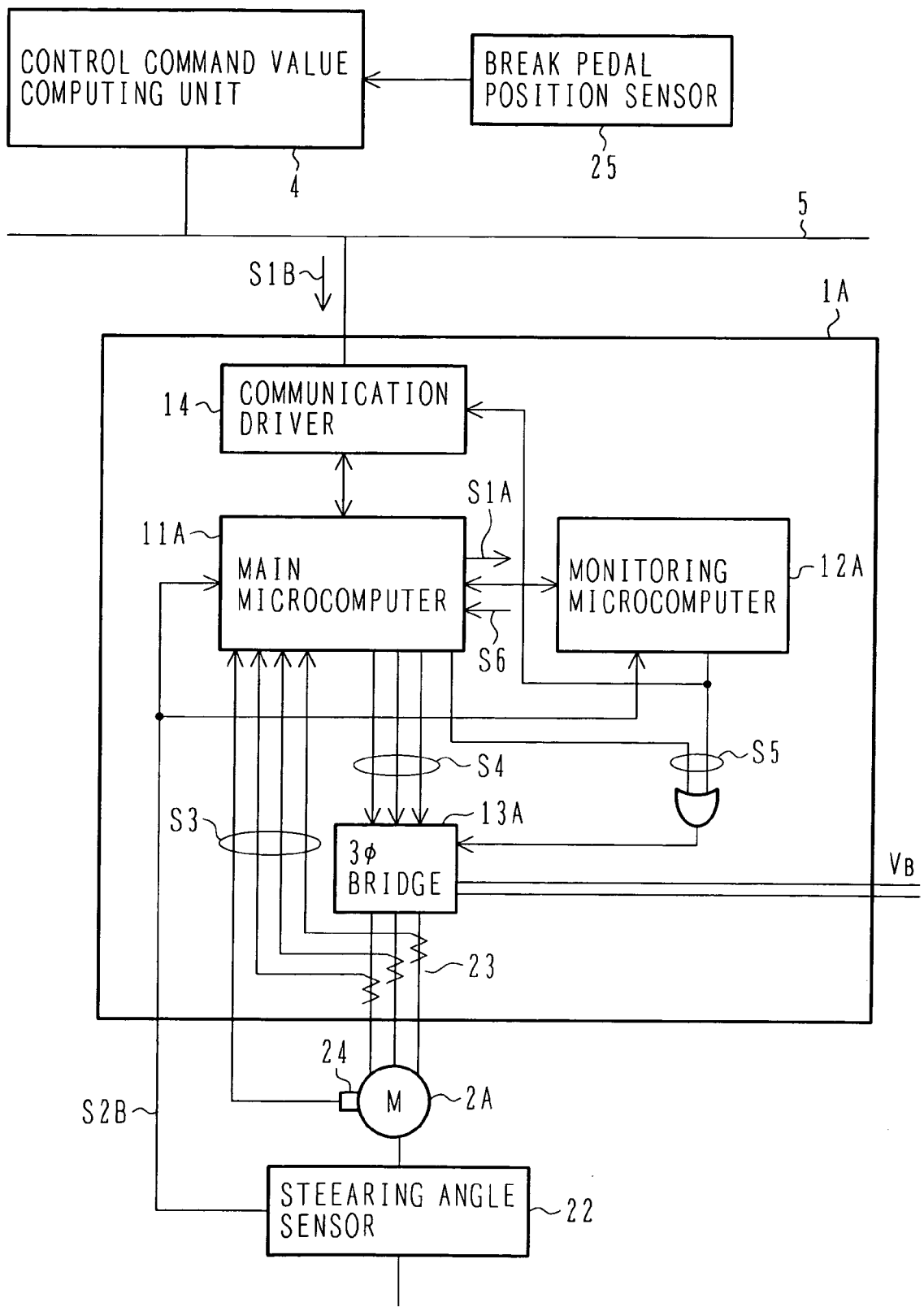
FIG. 12 is a block diagram of a vehicle controller according to a sixth embodiment of the present invention.

FIG. 12 shows a vehicle controller according to a sixth embodiment of the present invention. This sixth embodiment is related to a vehicle controller for controlling a motor, which is used to produce a braking force, in a vehicle control system (Brake-by-Wire system) that enables a driver's operation of stepping down a brake pedal to be reflected on a braking force generating mechanism of a vehicle through electronic control without employing mechanical linkages.

The vehicle control system of this embodiment comprises a control command value computing unit 4 for computing a command value (thrust command value) S1B of the force to press a brake pad against a disk rotor based on a signal value from a brake pedal position sensor 25 that measures a brake pedal operation input applied from the driver, a motor controller 1A for controlling a 3-phase motor 2A, and a communication network 5 for connecting the control command value computing unit 4 and the motor controller 1A to each other. The thrust command value S1B is inputted to the motor controller 1A via the communication network 5.

The motor controller 1A comprises a main microcomputer 11A serving as the control means, a monitoring microcomputer 12A serving as the monitoring means, a 3-phase bridge circuit 13A serving as the actuator driving means, and a communication driver 14 for receiving data from the communication network 5 or sending data to the communication network 5. In addition to the thrust command value S1B, the main microcomputer 11A further receives, as the actuator status signals S3, a signal from a sensor 24 for detecting the rotor position of the 3-phase motor 2A and signals from a circuit 23 for detecting motor currents, and as a thrust sensor signal S2B, a signal from a sensor (thrust sensor) 26 for detecting a force applied to press the brake pad against the rotor disk. Also, in addition to the thrust command value S1B, the monitoring microcomputer 12A further receives, as the thrust sensor signal S2B, the signal from the thrust sensor 26.

The monitoring microcomputer 12A checks a match between the thrust command value S1B and the signal S2B from the thrust sensor 26. When S1B and S2B are in mismatch beyond a certain allowable error range, the monitoring microcomputer 12A outputs the failure detected signal S5 to the 3-phase bridge circuit 13A, thereby stopping the supply of a source power VB to the 3-phase motor 2A.

Further, as in the case of the fourth embodiment, when the main microcomputer 11A detects a failure of the monitoring microcomputer 12A, it outputs the failure detected signal S5 to the 3-phase bridge circuit 13A.

While the embodiments of the present invention have been described above in detail, the present invention is not limited to those embodiments and can be variously modified within the scope of the technical ideal of the invention. For example, while the above embodiments have been described in connection with the practical cases of electronic control for the steering operation and the brake pedal stepping-down operation applied from the driver, it is needless to say that the present invention is also applicable to electronic control for the operation of stepping down an accelerator pedal.

What is claimed is:

1. A vehicle controller comprising:
   a control circuit receiving a first signal and outputting a driving signal;
   an actuator driving circuit receiving the driving signal from said control circuit and outputting a second signal;
   a monitoring circuit for comparing the first signal with a third signal and outputting a failure detected signal to said actuator driving circuit when a difference between the first signal and the third signal exceeds a predetermined value; and
   an actuator which is driven by the actuator driving circuit
   wherein:
   the first signal is a control command value which is used for controlling a control target,
   the control target is driven by the actuator, and
   the third signal is a control target status signal which is fed back from the control target.

2. The vehicle controller according to claim 1, wherein said monitoring circuit comprises:
   a comparing unit for comparing the first signal with the third signal; and
   a comparison trigger signal generator for generating a trigger signal to start a comparison in said comparing unit.

3. The vehicle controller according to claim 1, wherein said monitoring circuit receives the first signal via said control circuit.

4. The vehicle controller according to claim 1, wherein said monitoring circuit sends a normal operation confirmation signal to said control circuit.

5. The vehicle controller according to claim 4, wherein the normal operation confirmation signal is periodically sent, and if said control circuit cannot receive the normal operation confirmation signal for a predetermined period, said control circuit outputs a second failure detected signal, and
   supply of power to an external actuator is cut off with outputting of one of the failure detected signal from said monitoring circuit and the second failure detected signal from said control circuit.

6. The vehicle controller according to claim 1, wherein the logical product of the driving signal and the failure detected signal is computed such that supply of power to an external actuator is cut off when any of said control circuit and said monitoring circuit is failed.

7. The vehicle controller according to claim 1, wherein said vehicle controller is a device for controlling a steering motor which generates a steering force depending on a steering operation input, and the first signal represents a steering angle command value of a vehicle which is produced in accordance with a signal value from a sensor for measuring a steering operation input.

8. The vehicle controller according to claim 1, wherein when said monitoring circuit outputs the failure detected signal, said actuator driving circuit stops supply of power to said actuator and said control circuit stops reception of the control command value.

9. A The vehicle controller according to claim 1, wherein said vehicle controller is a device for controlling the actuator which generates a braking force, and the control command value is a command value indicating a force applied to press a brake pad against a disk rotor in accordance with a signal value from a brake pedal position sensor for measuring a brake pedal operation input.

10. The vehicle controller according to claim 1, wherein the control target is a steering force generation mechanism.

11. The vehicle controller according to claim 1, wherein the control target is a braking force generating mechanism.

* * * * *